United States Patent
Maillard et al.

(10) Patent No.: US 7,840,805 B2
(45) Date of Patent: Nov. 23, 2010

(54) METHOD OF AND APPARATUS FOR PROVIDING SECURE COMMUNICATION OF DIGITAL DATA BETWEEN DEVICES

(75) Inventors: Michel A. Maillard, Rambouillet (FR); Jean-Luc Dauvois, Lemans (FR); Frédéric Dublanchet, Paris (FR); David Leporini, Paris (FR)

(73) Assignee: Nagra Thomson Licensing, Boulogne-Billancourt (FR)

( * ) Notice: Subject to any disclaimer, the term of this patent is extended or adjusted under 35 U.S.C. 154(b) by 797 days.

(21) Appl. No.: 11/635,836

(22) Filed: Dec. 8, 2006

(65) Prior Publication Data
US 2007/0113073 A1    May 17, 2007

Related U.S. Application Data

(62) Division of application No. 09/958,632, filed as application No. PCT/IB00/00432 on Mar. 31, 2000, now abandoned.

(30) Foreign Application Priority Data
Apr. 13, 1999    (EP) .................................. 99400901

(51) Int. Cl.
*H04L 9/00* (2006.01)

(52) U.S. Cl. ..................... 713/168; 713/171; 380/279

(58) Field of Classification Search ................. 713/193, 713/171, 186, 168, 189, 156, 176; 380/255, 380/279
See application file for complete search history.

(56) References Cited

U.S. PATENT DOCUMENTS

| | | | |
|---|---|---|---|
| 5,371,794 A * | 12/1994 | Diffie et al. .................. | 713/156 |
| 5,784,464 A | 7/1998 | Akiyama et al. | |
| 5,915,021 A * | 6/1999 | Herlin et al. .................. | 705/67 |
| 6,118,874 A * | 9/2000 | Okamoto et al. ............ | 380/282 |
| 6,125,192 A * | 9/2000 | Bjorn et al. .................. | 382/124 |
| 6,249,867 B1 * | 6/2001 | Patel ........................... | 713/167 |
| 6,275,941 B1 | 8/2001 | Saito et al. | |
| 6,484,260 B1 * | 11/2002 | Scott et al. .................. | 713/186 |

FOREIGN PATENT DOCUMENTS

| | | | |
|---|---|---|---|
| JP | 1125048 A | 5/1989 | |
| JP | 8305662 A | 11/1996 | |
| WO | WO 9738530 A1 * | 10/1997 | |

* cited by examiner

*Primary Examiner*—Gilberto Barron, Jr.
*Assistant Examiner*—Samson B Lemma
(74) *Attorney, Agent, or Firm*—Osha • Ling LLP

(57) ABSTRACT

A method of secure communication of digital data between devices, including validating, by a security module, the devices using device identifiers, generating a random key in the security module, and transmitting the random key to the devices.

9 Claims, 8 Drawing Sheets

METHOD OF AND APPARATUS FOR PROVIDING SECURE COMMUNICATION OF DIGITAL DATA BETWEEN DEVICES

CROSS-REFERENCE TO RELATED APPLICATIONS

This patent application is a divisional application of U.S. patent application Ser. No 9/958,632, filed Jan. 15, 2002.

The present invention relates to a method of and apparatus for providing secure communication of digital data between devices. More specifically, the present invention relates to preventing illegal copying and redistribution of digitally recorded data.

The introduction of digital technology in the audiovisual field has brought considerable advantages to the consumer in comparison with analog technologies, notably in relation to the quality of reproduction of sound and image and the durability of the supporting medium. The compact disk has all but replaced traditional vinyl records and a similar trend is expected with the introduction of new digital products aimed at the multimedia and home entertainment markets generally, notably the DVD (digital video disk or digital versatile disk) players.

A particular problem associated with digitally recorded data lies in its ease of reproduction and the possibilities for piracy that arise therefrom. A single digital recording may be used to make any number of perfect copies without any degradation in quality of the sound or image. This problem is a serious one, particularly with the advent of recordable digital products such as the minidisk or DAT, and the reluctance of entertainment companies to license copyright works whilst this problem remains has acted as a break on the introduction into the market of new media products.

At present, the most practically available solution against unauthorised reproduction of copyright works has been a legal one, and a number of countries in Europe and elsewhere have introduced anti-piracy legislation to combat the increasing number of pirate films, CDs etc being brought onto the market. For obvious reasons, a legal solution is less than optimal from the point of view of preventative action.

Technological solutions proposed to date to prevent the unauthorised copying and distribution of digitally recorded data have been extremely basic, relying for example on the idea of using some form of digital "handshake" between devices in the digital audiovisual system, for example, between the digital data, or DVD, player and the digital recorder, and between the DVD player and the digital television, so as to verify the origin of the device receiving the data from the DVD player. Such protection is, however, effective against only the most low level of copying activity, since the handshake signal is typically not protected in any way and may be easily read and reproduced so as to convert, for example, an unauthorised recorder device into an apparently authorised recorder device.

The aim of the present invention is to overcome the disadvantages associated with the prior art techniques and to provide a technological solution against the unauthorised copying and reproduction of digitally recorded copyright works.

In a first aspect, the present invention provides a method of providing secure communication of digital data between devices, said method comprising the steps of communicating from one device an identifier of a device to an independent security module and performing device validation depending on the identity of the communicated identifier.

In such a method, a independent security module is used to validate a device in, for example, a digital audiovisual system.

For example, in a system in which data is communicated from a DVD player to a digital recorder, the user of the system might possess an appropriate smartcard for validating the recorder and/or the player before any data is transferred. Thus, by using a security module to validate devices, an extra level of security can be added to the system.

Indeed, the use of an independent security module can lead to a highly personalized digital audiovisual system. For instance, the security module may enable data to be transferred from a DVD player to a digital television only if both the player and television are validated by the security module, thus enabling the digital data to be viewed only on the user's personal television.

The use of a security module to validate linked devices also provides an advantage in that device validation can become independent of the link between the devices. Thus, if the communication link is intercepted by a third party, the identifiers of the devices cannot be obtained as they are not passed between the devices but from the individual devices to a security module.

Such security modules can take any convenient form depending on the physical size and characteristics of the modules. For example, the security module may be detachable, for example removably insertable into a socket provided in the device or a separate module connected to the device. In some cases a smart card equivalent to a bank card may be used (as or as part of the security module), but other formats, such as PCMCIA type cards, are equally possible. Thus, the security module may be easily replaced in order to update the rights provided by the security module, for example to invalidate certain devices in the event of the system provider becoming aware of cloning of those devices.

The device identifier may take any convenient form. For example, the identifier may be a public key associated with the device.

The security module may perform device validation by comparing the communicated identifier with at least one stored identifier. The stored identifiers may be stored in a memory of the security module. The identifiers may be stored in the form of a list, the received identifier being compared with the identifiers in the list in order to validate the device. This can provide for fast and efficient validation of the device.

Each stored identifier may be associated with a respective one of a valid device or an invalid device. Upon receipt of the identifier, the security module may compare the received identifier with stored identifiers associated with invalid devices, and/or with stored identifiers associated with valid devices.

Thus, the security module may contain at least one of a "revocation list" for blacklisting non-compliant devices and an "authorization list" for restricting transfer of data to between pre-registered devices only. Device identifiers intentionally published by third parties, for example, on the Internet, can be added to the revocation list when periodically updating the security module in order to prevent data from being transferred to or from these devices. However, the use of an authorization list can also prevent device identifiers intentionally published on the Internet from working since these identifiers will not be valid anywhere except in, for example, a home network.

The authorization list is therefore likely to be much shorter than the revocation list, thus saving memory capacity, and is likely to require less-frequent updating. Thus, in a second aspect the present invention provides a method of providing secure communication of digital data between devices, said method comprising the steps of comparing an identifier communicated from one device with at least one stored identifier, each stored identifier being associated with a respective valid device, and validating the device if the communicated identifier is identical to the or one of the stored identifiers.

It is preferable that said at least one stored identifier is stored in an independent security module.

The communicated identifier may be compared with identifiers associated with valid devices according to the setting of a flag. The flag may be stored within the security module or may be transmitted to the security module by the device.

For example, the security module may compare the received identifier with stored identifiers associated with invalid devices when the flag has a first setting, and compare the received identifier with stored identifiers associated with valid devices when the flag has a second setting.

The flag may be set according to rights provided to the user. For example, the flag may take the first setting for a shop wherein a number of different devices are used, the setting of the flag being such that the received identifier is compared with stored identifiers associated with invalid devices only. The flag may take the second setting for a home user wherein only a small number of devices are used, the setting of the flag being such that the received identifier is compared with stored identifiers associated with valid devices only.

In one embodiment, the security module may compare the received identifier with stored identifiers associated with invalid devices when the flag has a setting "0", and compare the received identifier with both stored identifiers associated with invalid devices and stored identifiers associated with valid devices when the flag has a setting "1".

In a preferred embodiment of the invention, certificates are passed between the device and the security module to validate the device.

The use of a certificate system to validate a device can provide for secure transmission of the identifier from the device to the security module. Thus, the identifier of the device may be communicated to the security module in an encrypted certificate, and so problems associated with the transmission of identifiers of devices "in the clear" can be avoided.

The certificate may be signed, for example, using a private key, such as a private key of the manufacturer of the device, to enable the authenticity of the communicated certificate to be verified. Thus, if the security module determines that the data contained in the certificate and its signature do not correlate, the certificate can be rejected.

An equivalent key to the private key may be communicated to the security module in a certificate encrypted by a system private key, a system public key being stored in both the security module and the device.

The encrypted certificate is preferably further encrypted by the device using a security module public key and communicated to the security module. The encrypted certificate may be subsequently decrypted by the security module first using a security module private key and secondly using said equivalent key to enable the identifier of the device to be extracted from the decrypted certificate.

The public key of the security module may be communicated by the security module to the device in a certificate. The certificate including the public key of the security module may be encrypted using a private key, for example, of the manufacturer of the security module. This certificate may also be signed using the private key to enable the authenticity of the communicated certificate to be verified. An equivalent key to the private key may be communicated to the device in a certificate encrypted by the system private key, the system public key being stored in both the security module and the device.

The certificate containing the device identifier may be randomised by the device prior to encryption, the randomisation being reversed by the security module following decryption of the certificate. This can increase the security of the passing of the device identifier from the device to the security module.

In addition to verifying a device, the security module may transfer information to a device in order, for example, to enable the device to process digital data received from another device. Thus, it is preferable to create a secure communication channel between the device and the security module.

In one preferred embodiment of the present invention, a random number is generated by the device, the random number and the certificate containing the device identifier being encrypted by the device using a public key of the security module and communicated to the security module. The encrypted random number and certificate may be decrypted by the security module using a private key of the security module to obtain the random number and to enable the identifier of the device to be extracted from the decrypted certificate.

The extracted random number may subsequently be stored in the security module such that data communicated between the security module and the device may thereafter be encrypted and decrypted by the random number in the security module and the device, thereby providing a secure communication link between the device and the security module.

Thus, in a third aspect the present invention provides a method of providing secure communication of digital data between a device and a security module, said method comprising the steps of transferring to the security module a random number and an identifier of the device encrypted by a public key of the security module, the security module decrypting the random number and device identifier using a private key of the security module, validating the device using the device identifier and, upon validation of the device, using the random number to encrypt and decrypt data communicated between the security module and the device.

Preferably, the device identifier is included in a certificate, the certificate being encrypted using the public key of the security module.

The random number may be randomised by the device prior to encryption, the randomisation being reversed by the security module following decryption of the random number.

Alternatively, the random number and the certificate containing the device identifier may be randomised by the device prior to encryption, the randomisation being reversed by the security module following decryption of the random number and certificate.

In order to increase the security of the communication link between the device and the security module, the security module may communicate to the device a random key generated in the security module and encrypted using the random number, the device decrypting the key using the random number and thereafter using the key to encrypt data sent to the security module.

In addition to validating a device and for secure communication of data between the device and the security module, the security module may be adapted to provide access rights to data received by the device.

For example, the device may communicate to the security module an encrypted Entitlement Control Message (ECM) containing a control word for descrambling data, the device further encrypting the encrypted ECM using the key. Thus, ECMs transmitted between a device and a security module are encrypted twice, one of the encryption keys being generated by the security module and therefore unique to the device and the security module. This can provide significant improvements in the prevention of illegal copying and redistribution of ECMs.

The security module may decrypt the encrypted ECM, extract the control word from the ECM and communicate to the device the control word encrypted using the key.

This can enable a device such as a digital television to descramble scrambled data received from a DVD player. Moreover, the control word may always be passed to the device in encrypted form, the encryption being conducted using a key previously transmitted to the device following validation of the device. Therefore, the storage of additional public/private keys for encrypting and decrypting the control words, or personalization of the device to the security module (or vice versa) is not required.

Alternatively, the device may communicate to the security module an encrypted eXtended Entitlement Control Message (XECM) containing eXtended Control Management Information (XCMI), or access rights, to data, the device further encrypting the encrypted XECM using the key. The security module may decrypt the encrypted XECM, modify the access rights contained in the XECM, encrypt the modified XECM and communicate to the device the encrypted modified XECM further encrypted using the key.

Thus, the security module may modify access rights afforded to the device by an XECM. For example, if the device is a digital recorder device, these rights may include the prohibition of any subsequent re-recording of the stored data, the number of times which the stored data may be replayed, the expiry date of replay, etc.

In order to enable the devices to function more effectively it is desired to provide a securised or encrypted communication link between the devices. The implementation of a secure link between the devices can be used to enable information needed to prepare or play a recording to be passed freely between the devices. Unfortunately, the independence of activities between a manufacturer of a DVD player and a manufacturer of recording equipment responsible for the recorder may lead to a number of problems regarding the provision of encryption keys for this purpose.

For example, a player manufacturer may not place sufficient confidence in the integrity of security at the manufacturing site of a recorder to entrust the manufacturer with, for example, a secret symmetric algorithm key needed by the recorder to decrypt communications encrypted using the equivalent key held by the DVD player.

Furthermore, the separation of activities may make it impractical to envisage a situation in which the recorder is sent to a broadcast system manager for personalisation with the appropriate keys. For. this reason, it is necessary to envisage a solution which allows the greatest independence of operation for the player and recorder.

In order to solve such problems, in a preferred embodiment of the present invention, data is communicated between first and second devices, and upon validation of each device by the security module, the security module communicates to the first device a random key generated in the security module and encrypted using the random number generated by the first device, the first device decrypting the key using the random number generated thereby, and communicates to the second device the key encrypted using the random number generated by the second device, the second device decrypting the key using the random number generated thereby, the key thereafter being used to encrypt data communicated to the security module by the devices and data communicated between the devices.

Accordingly, in a fourth aspect the present invention provides a method of providing secure communication of digital data between devices, said method comprising the step of providing a security module, generating a random key (SK) in the security module and encrypting data communicated between the devices using the random key.

By this method, the generation of an encryption key for securing communication between the devices is performed by a security module in communication with the devices, and so key generation is performed independently of the devices.

Such a method can provide a secure, flexible and upgradeable device interface-independent system for providing secure communication of digital data between devices. The system can be based on a smartcard for generating the session key, and therefore can be cheap and enable fast action against piracy by the ease of providing updated smartcards, particularly as the responsibility of updating security can be the responsibility of a dedicated smartcard provider and not the device manufacturers.

The security module may communicate to each device the key encrypted using a random number generated by that device, the device decrypting the key using the random number.

Each device may communicate to the security module the respective random number encrypted using a public key of the security module. The encrypted random number may be subsequently decrypted by the security module using a private key of the security module to obtain the random number. Each random number may be randomised by the respective device prior to encryption, the randomisation being reversed by the security module following decryption of the random number. Preferably, the security module validates each device before transmitting the key to each device. To enable such validation to be performed, each device preferably communicates an identifier thereof to the security module for validation of the device by the security module.

The key may be periodically changed by the security module. The key may be updated, for example, on an hourly basis, or after a predetermined number of data packets are passed between the devices. This can provide further security to the data communication. Alternatively, the key may be randomly changed by the security module, for example, upon switching the device on, disc insertion, zapping of the device by the user, establishment of a connection with the security module etc.

A preferred embodiment of the present invention is applied to a home network system, the devices corresponding to first and second consumer electronic devices adapted to transfer data therebetween via a communication link. The communication link between the two devices may take one of many forms, for example, a radio, telephone or infra-red link. However, preferably, the communication link is implemented by connection of the first and second devices on a bus, for example, a IEEE 1394 bus link.

The first device may communicate to the second device scrambled audio and/or visual data and an encrypted Entitlement Control Message (ECM) containing a control word for descrambling the data, said data and said encrypted ECM being encrypted by the first device using the key.

The second device may decrypt the data and the encrypted ECM using the key, separate the encrypted ECM from the data, and communicate to the security module the encrypted ECM re-encrypted using the key. The security module may decrypt the encrypted ECM, extract the control word from the ECM and communicate to the second device the control word encrypted using the key. In this embodiment, the first device may be a DVD player and the second device may be a digital television Furthermore, the security module may modify the ECM and communicate to the second device the modified ECM encrypted using the key. In this embodiment, the first device may be a DVD player and the second device may be a digital recorder device.

In a fifth aspect the present invention provides apparatus for providing secure communication of digital data between devices, said apparatus comprising a security module comprising means for receiving an identifier of a device and means for performing device validation depending on the identity of the received identifier.

In a related aspect the present invention provides a security module for providing secure communication of digital data between devices and arranged to receive an identifier of a device and to perform device validation depending on the identity of the received identifier.

In a sixth aspect the present invention provides apparatus for providing secure communication of digital data between devices, said apparatus comprising means for storing at least one identifier, each stored identifier being associated with a respective valid device, means for comparing an identifier of a device with said at least one stored identifier, and means for validating the device if the identifier of the device is identical to the or one of the stored identifiers.

In a related aspect the present invention provides a security module for providing secure communication of digital data between devices and arranged to store at least one identifier, each stored identifier being associated with a respective valid device, to compare an identifier of a device with said at least one stored identifier, and to validate the device if the identifier of the device is identical to the or one of the stored identifiers.

In a seventh aspect the present invention provides a system for providing secure communication of data between a device and a security module, said device comprising means for communicating to the security module a random number and an identifier of the device encrypted by a public key of the security module, the security module comprising means for decrypting the random number and device identifier using a private key of the security module, means for validating the device using the device identifier, and means for using the random number to encrypt and decrypt data communicated between the security module and the device.

In a related aspect the present invention provides a security module arranged to receive a random number and an identifier of a device encrypted by a public key of the security module, decrypt the random number and device identifier using a private key of the security module, validate the device using the device identifier, and, upon validation of the device, use the random number to encrypt and decrypt data communicated between the security module and the device In an eighth aspect the present invention provides apparatus for providing secure communication of digital data between devices, said apparatus comprising the devices and a security module comprising means for generating a random key and means for communicating the random key to the devices, each device being arranged to encrypt data communicated between the devices using the random key.

In a related aspect the present invention provides a security module for providing secure communication of digital data between devices and arranged to generate a random key (SK) for encrypting data communicated between the devices and to communicate the random key to the devices.

Whilst the invention has been described with reference to a first and second device, it will be appreciated that the same principle may be used to set up a chain of communication between a series of such devices.

Suitable algorithms for use in this invention for generating private/public keys may include RSA, Fiat-Shamir, or Diffie-Hellman, and suitable symmetric key algorithms may include DES type algorithms, for example. However, unless obligatory in view of the context or unless otherwise specified, no general distinction is made between keys associated with symmetric algorithms and those associated with public/private algorithms.

The terms "scrambled" and "encrypted", and "control word" and "key" have been used at various parts in the text for the purpose of clarity of language. However, it will be understood that no fundamental distinction is to be made between "scrambled data" and "encrypted data" or between a "control word" and a "key".

Additionally, the terms "encrypted" and "signed", and "decrypted" and "verified" have been used at various parts in the text for the purpose of clarity of language. However, it will be understood that no fundamental distinction is to be made between "encrypted data" and "signed data", and "decrypted data" and "verified data".

Similarly, the term "equivalent key" is used to refer to a key adapted to decrypt data encrypted by a first mentioned key, or vice versa.

Features described above relating to method aspects of the present invention can also be applied to apparatus aspects, and vice versa.

Preferred features of the present invention will now be described, by way of example only, with reference to the accompanying drawings, in which.

Figure 1:
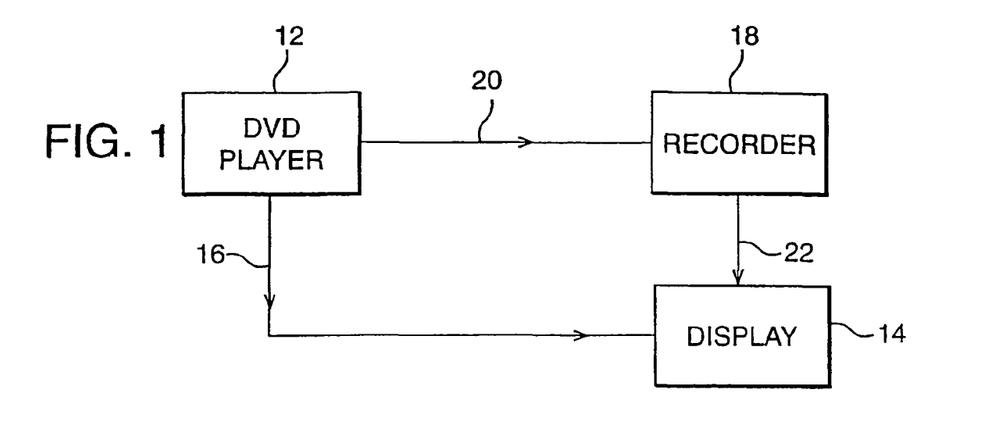
FIG. 1 shows the elements of a digital audiovisual system.

Referring to FIG. 1, elements of a digital audiovisual system 10 for recordal and replaying of digital data will first be described. Whilst the invention will be discussed in relation to the playing of audiovisual data on a DVD player, it may also conveniently be applied, for example, to the playing of exclusive audio information subsequently recorded on a DAT or minidisc recorder or even to the communication of software recorded on the hard disc of a computer.

Typically the audiovisual system comprises a DVD player 12 for the playback of digital audiovisual data stored, for example, on disk or tape. The DVD player is linked to a digital display 14 for the display of the data played by the DVD player 12. The display 14 is preferably provided in the form of a digital television. The communication link 16 between the player 12 and display 14 may take many forms, for example, a radio, telephone or infra-red link. However, preferably, the communication link is implemented by connection of the player and television on a bus, for example, a IEEE 1394 bus link.

The system additionally includes a digital recorder 18, such as a DVHS or DVD recorder, adapted to communicate with the DVD player 12, for example, via an IEEE 1394 bus 20. The recorder 18 receives a digital recording support (not shown) on which information is recorded. The recorder 18 includes a direct link 22 to the display 14. However, digital audiovisual data may be passed from the player 12 to the recorder 18 prior to display.

Whilst the elements of player 12, display 14 and recorder 18 have been indicated separately, it is conceivable that some or all of these elements may be merged, for example, to provide a combined player/television set.

In order to provide secure communication of data between devices in the digital audiovisual system, for example, to prevent the unauthorised copying and distribution of digitally recorded data, a validation system is used to validate one or more of the devices in the audiovisual system prior to any communication of data between the devices.

Figure 2:
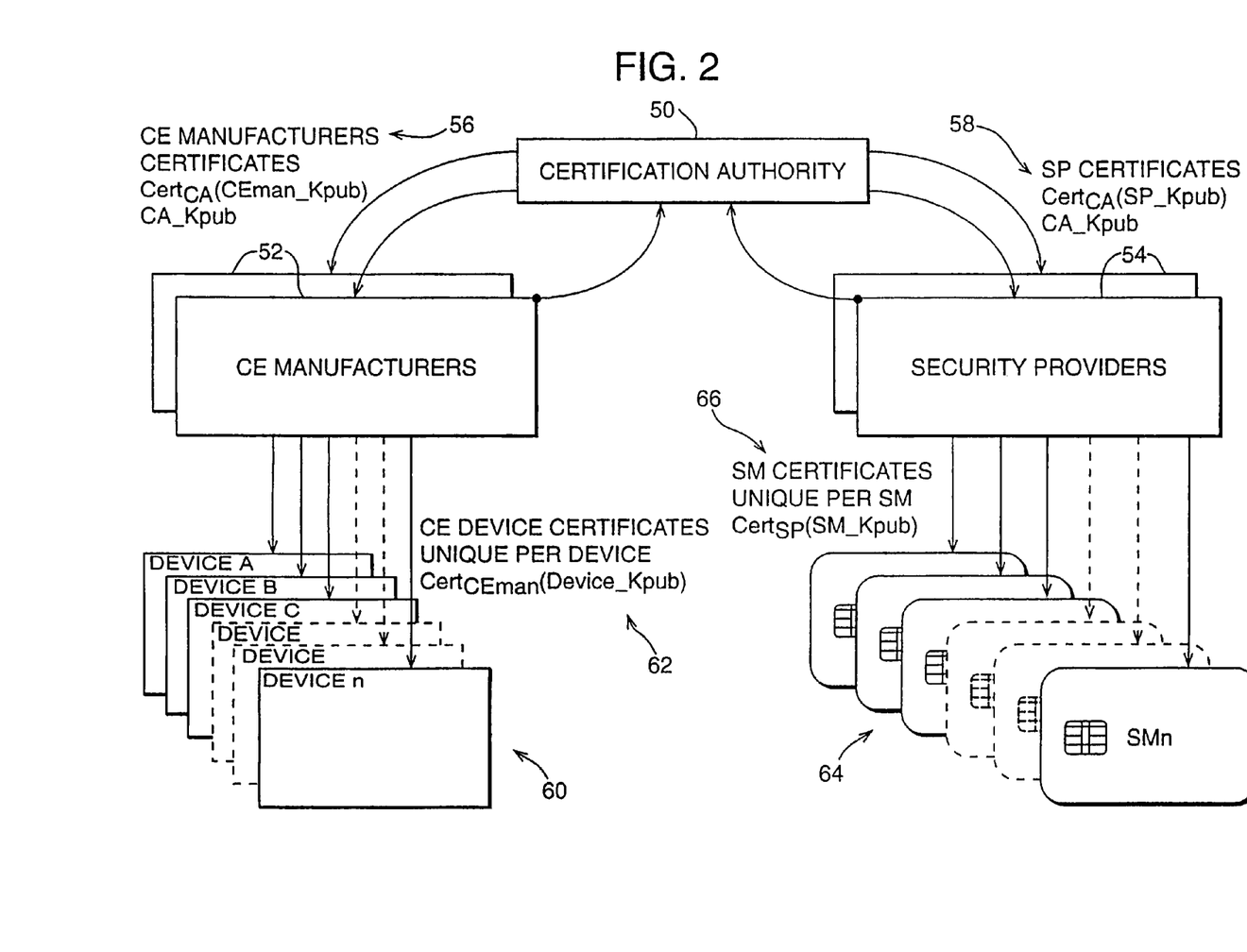
FIG. 2 shows the distribution of certificates in a digital audiovisual system.

A preferred device validation system is based on the transfer of certificates between a device and a security module. With reference to FIG. 2, each device and security module is assigned a unique certificate for validation purposes.

In a first stage of a certificate distribution system a certification authority (CA) 50 delivers encrypted certificates to both consumer electronics (CE) manufacturers 52 and security providers (SP) 54.

The CA 50 communicates to each CE manufacturer 52 a respective encrypted certificate $Cert_{CA}$(CEman_Kpub) shown at 56. This certificate contains, inter alia, a manufacturer public key CEman_Kpub and is encrypted by a system, or CA, private key CA_Kpri. To enable the contents of the certificate to be decrypted by the CE manufacturer 52, the CA 50 communicates to the CE manufacturer 52 the CA public key CA_Kpub. It should be mentioned that the private key CA_Kpri is unique to and held exclusively by the CA 50.

In a similar manner, the CA 50 communicates to each security provider 54 a respective encrypted certificate $Cert_{CA}$(SP_Kpub) shown at 58. This certificate contains, inter alia, a security provider public key SP_Kpub and is encrypted by the CA private key CA_Kpri. To enable the contents of the certificate to be decrypted by the security provider 54, the CA 50 communicates to the security provider 54 the CA public key CA_Kpub.

In a second stage of the certificate distribution system, each consumer electronics (CE) manufacturer 52 and security provider (SP) 54 assigns respective certificates to its own products.

Each CE manufacturer 52 assigns to each of its CE devices 60 a respective encrypted certificate $Cert_{CEman}$(Device_Kpub) shown at 62. This certificate contains, inter alia, a unique device public key Device_Kpub, together with an indication of the device capability (recorder, player, etc.). The certificate is encrypted by an equivalent key to the public key CEman_Kpub. To enable the contents of the certificate to be decrypted, the CE manufacturer 52 stores in the CE device the CA public key CA_Kpub and the encrypted certificate $Cert_{CA}$(CEman_Kpub) of the CE manufacturer 52. Thus, the public key Device_Kpub of the CE device 60 can serve as an identifier of the device.

Similarly, each security provider 54 assigns to each security module 64 a respective encrypted certificate $Cert_{SP}$(SM_Kpub) shown at 66. Such security modules 66 can take any convenient form depending on the physical size and characteristics of the modules. For example, the security module may be removably insertable into a socket provided in a CE device 60 or may be a separate module connected to the device 60. In some cases a smart card equivalent to a bank card may be used, but other formats such as PCMCIA type cards are equally possible.

The encrypted certificate assigned to the security module 64 contains, inter alia, a unique security module public key SM_Kpub. The certificate is encrypted by an equivalent key to the public key SP_Kpub. To enable the contents of the certificate to be decrypted, the security provider 54 stores in the security module 64 the CA public key CA_Kpub and the encrypted certificate $Cert_{CA}$(SP_Kpub) of the security provider. Thus, the public key SM_Kpub of the security module 64 can serve as an identifier of the security module.

A signature may be included in any of the above certificates to enable the contents of the certificate to be verified following decryption of the certificate. The contents of the certificate may be signed using the key used to encrypt the certificate.

Figure 3:
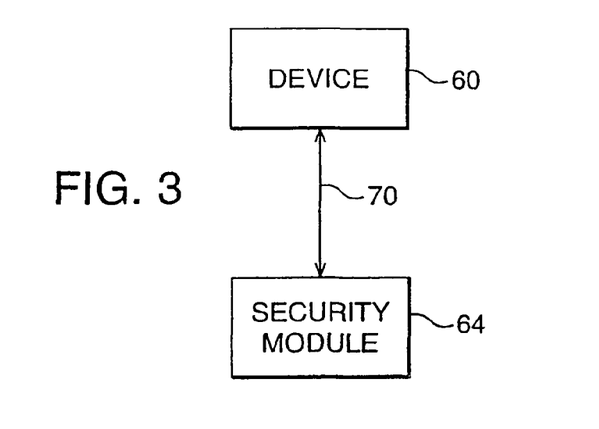
FIG. 3 shows the connection of a security module to a device.
Figure 4:
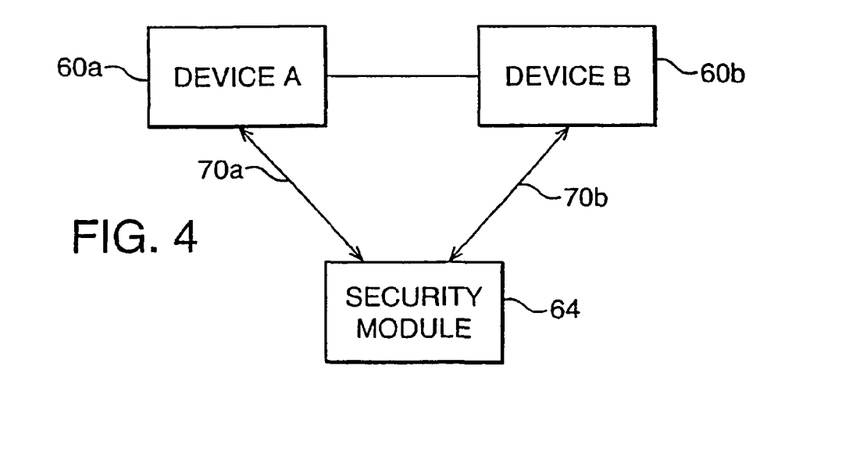
FIG. 4 shows the connection of a security module to two devices.

Validation of a device in the digital audiovisual system is carried out by the exchange of certificates between the device and a security module. As shown in FIG. 3, in a first embodiment the security module 64 is connected to the device 60 via a communication link 70 to enable the security module to validate that device only. However, as shown in FIG. 4, the security module may alternatively be connected to two or more connected devices 60a, 60b via respective communication links 70a, 70b.

Figure 5:
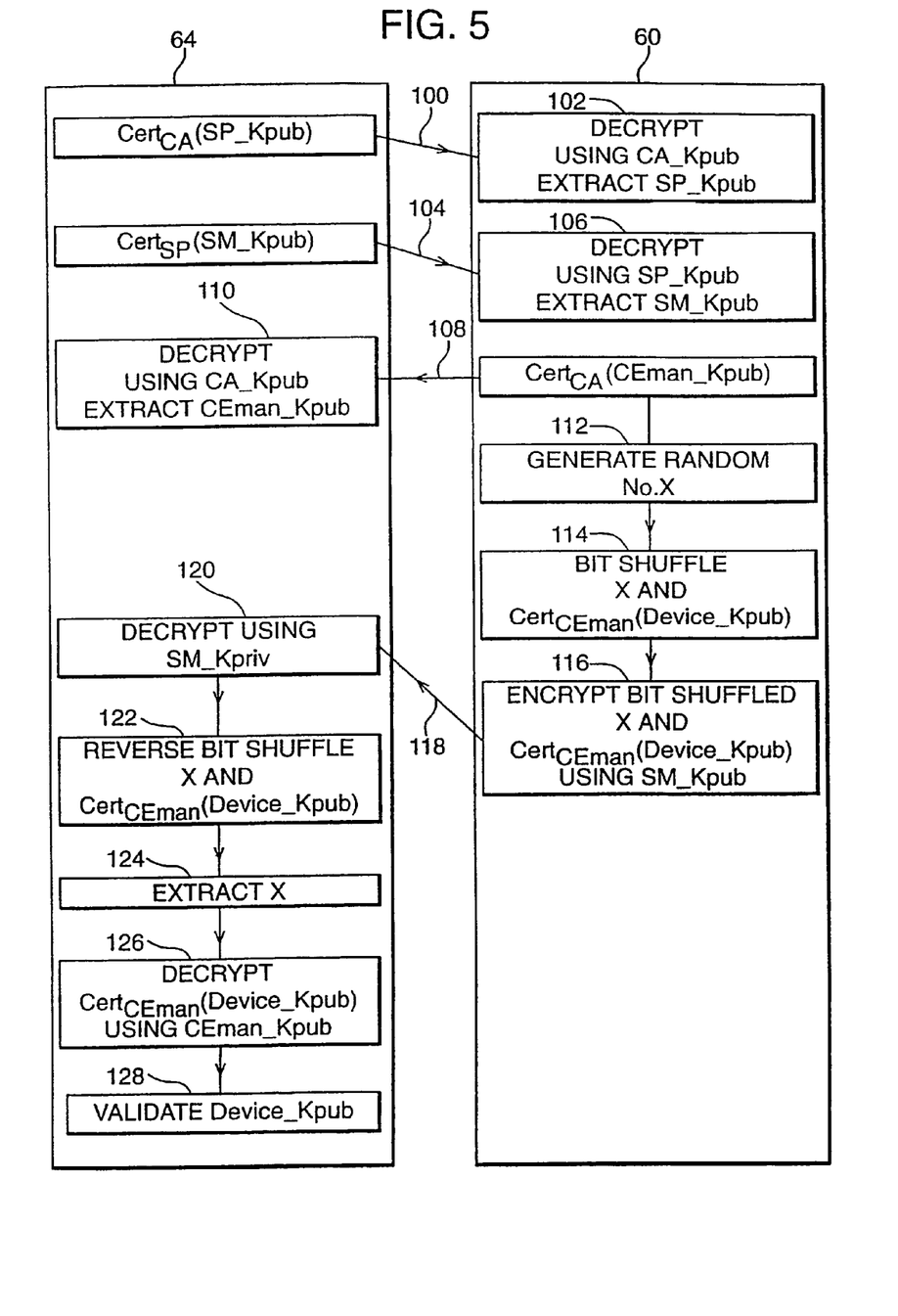
FIG. 5 shows the steps associated with the validation of a device by the security module and subsequently providing secure communication between the device and the security module.

Validation of a single device by a security module will now be described with reference to FIG. 5.

The validation procedure can be initiated at any time, for example, upon switching the device on, disc insertion, zapping of the device by the user, establishment of connection with the security module etc.

The validation procedure is initiated by the security module. As shown at 100, the security module 64 communicates to the device 60 the encrypted certificate $Cert_{CA}$(SP_Kpub) of the security provider 54. At 102, the device decrypts the contents of the encrypted certificate $Cert_{CA}$(SP_Kpub) using the public key CA_Kpub of the CA 50 to enable the public key SP_Kpub of the security provider 54 to be extracted from the certificate.

Following communication of the encrypted certificate $Cert_{CA}$(SP_Kpub) to the device 60, at 104 the security module 64 communicates its own unique encrypted certificate $Cert_{SP}$(SM_Kpub) to the device 60. At 106 the device decrypts the contents of the encrypted certificate $Cert_{SP}$(SM_Kpub) using the public key SP_Kpub of the security provider previously extracted by the device 60 from the encrypted certificate $Cert_{CA}$(SP_Kpub) in order to enable the public key SM_Kpub of the security module 64 to be extracted from the certificate.

At 108, the device 60 communicates to the security module 64 the encrypted certificate $Cert_{CA}$(CEman_Kpub) of the CE manufacturer 52. At 110, the security module 64 decrypts the encrypted certificate $Cert_{CA}$(CEman_Kpub) using the public key CA_Kpub of the CA 50 to enable the public key CEman_Kpub of the CE manufacturer 52 to be extracted from the certificate.

Following communication of the encrypted certificate $Cert_{CA}$(CEman_Kpub) to the security module 64, at 112 the device 60 generates a random number X. The random number X performs no function in the validation of the device by the security module. Instead, the random number X is used to generate a secure authenticated channel (SAC) between the device 60 and the security module 64. This is described in more detail below.

At 114 the device 60 performs bit shuffling of random number X and the encrypted certificate $Cert_{CEman}$(Device_Kpub) stored in the device 60 in order to scramble the random number X and encrypted certificate $Cert_{CEman}$(Device_Kpub). The bit shuffled random number X and encrypted certificate $Cert_{CEman}$(Device_Kpub) are subsequently encrypted at 116 using the public key SM_Kpub of the security module 64 previously communicated to the device 60 by the security module at step 104, and communicates the encrypted bit shuffled random number and encrypted certificate $Cert_{CEman}$(Device_Kpub) to the security module 64 at step 118.

At 120, the security module 64 decrypts the encrypted bit shuffled random number and encrypted certificate $Cert_{CEman}$(Device_Kpub) using an equivalent key SM_Kpriv to the public key SM_Kpub. The bit shuffling of the shuffled random number and encrypted certificate $Cert_{CEman}$(Device_Kpub) is reversed at step 122.

An algorithm used to bit shuffle the random number X and encrypted certificate $Cert_{CEman}$(Device_Kpub) may be stored in the security module 64 to enable the bit shuffling to be reversed. Alternatively, the security module 64 may send to the device 60 a random number, referred to as a random challenge, Z, following receipt of the encrypted certificate $Cert_{CA}$(CEman_Kpub). The random challenge Z is bit shuffled by the device 60, encrypted using the security module public key SM_Kpub and transmitted to the security module, preferably at the same time as the bit shuffled random number X and encrypted certificate $Cert_{CEman}$(Device_Kpub). The security module 64 decrypts the encrypted shuffled random challenge Z and compares the bit shuffled random challenge with the unshuffled random challenge stored therein in order to determine how the random challenge Z has been shuffled by the device 60. The security module 64 uses the result of this challenge to reverse the bit shuffling applied to the random number X and encrypted certificate $Cert_{CA}$(CEman_Kpub) by the device.

Returning to FIG. 5, the random number is extracted and stored by the security module 64 at step 124. At 126, the security module 64 decrypts the encrypted certificate $Cert_{CEman}$(Device_Kpub) using the public key CEman_Kpub of the CE manufacturer 52 previously transmitted to the security module 64 by the device 60 in order to enable the public key Device_Kpub of the device 60 to be extracted from the certificate.

Validation of the device 60 is carried out by the security module 64 using the public key Device_Kpub of the device 60 at step 128. The security module compares the received device public key Device_Kpub with a list of device public keys previously stored in the security module. The list of device public keys may be generated by the CA 50 and stored, for example, in memory, such as non-volatile memory, in the security module 64 by the security provider 54.

The security module 64 supports two types of list. A "revocation list" contains device public keys associated with invalid devices and is used to blacklist non-compliant devices. An "authorization list" contains device public keys associated with valid devices and is used to restrict transfer of data to between pre-registered devices only.

Device identifiers intentionally published by third parties, for example, on the Internet, can be added to the revocation list by the CA 50 when periodically updating the security module 64 in order to prevent data from being transferred to or from these devices or clones of these devices. However, the use of an authorization list can also prevent device identifiers intentionally published on the Internet from working since these identifiers will not be valid anywhere except in, for example, a home network.

A flag embedded within the encrypted device certificate or the encrypted security module certificate determines the list with which the received device public key is compared. For example, the security module may compare the received device public key with stored public keys associated with invalid devices when the flag has a setting "0", and compare the received device public key with both stored public keys associated with invalid devices and stored public keys associated with valid devices when the flag has a setting "1".

If the device 60 is determined to be an invalid device, the security module 64 terminates communication with the device 60. If, as shown in FIG. 4, the security module is in communication with other devices, communication with those devices is also terminated.

Figure 6:
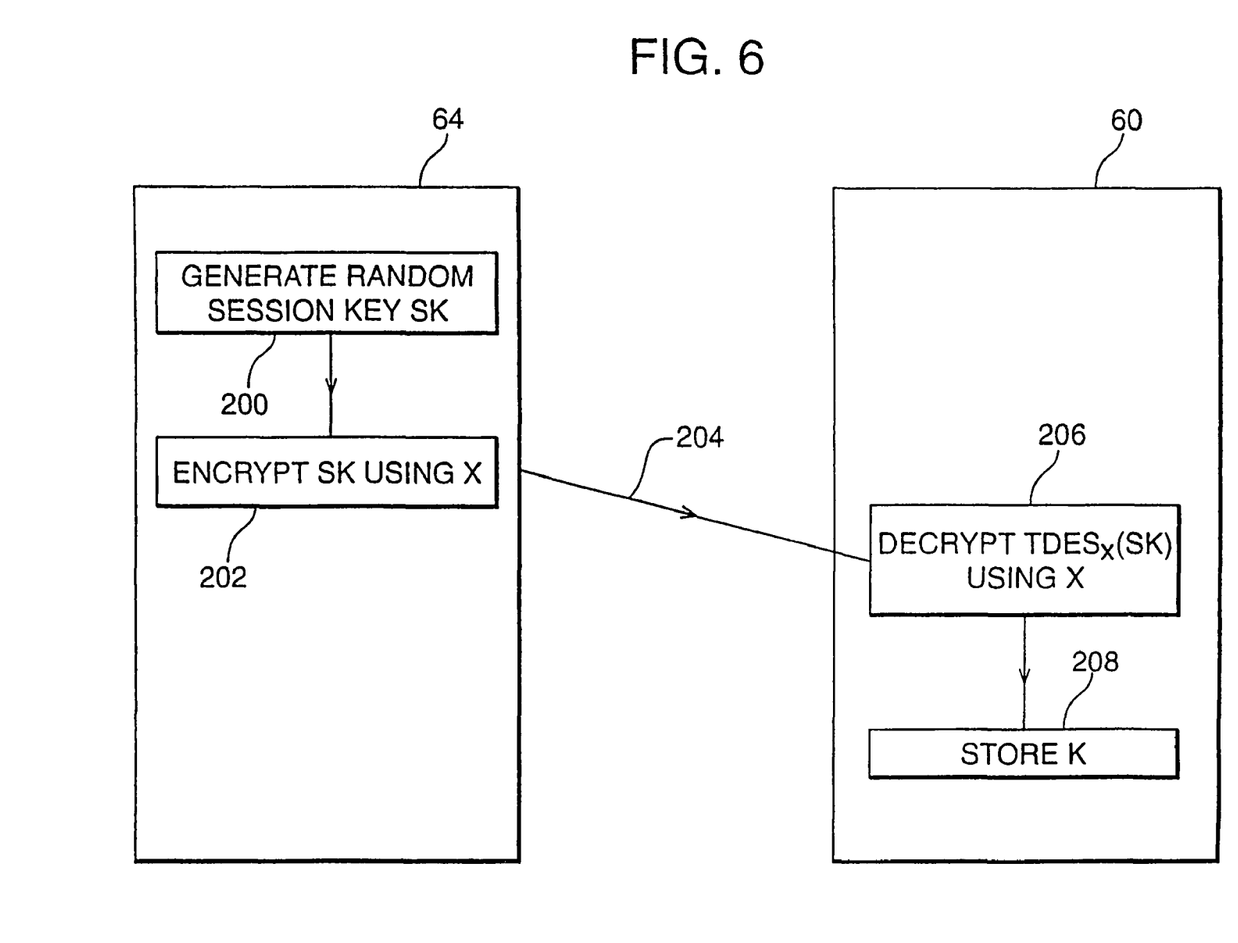
FIG. 6 shows the steps associated with the generation of a secure channel of communication between a device and a security module.

If the device is determined to be a valid device, the security module 64 generates a secure authenticated channel (SAC) of communication between the device 60 and the security module 64. FIG. 6 shows the steps associated with the generation of a secure authenticated channel of communication between a device and a security module.

In step 200 the security module 64 generates a random session key SK. The random session key SK is TDES encrypted at step 202 by the security module 64 using the random number X transmitted to the security module 64 by the device 60. The encrypted session key $TDES_X(SK)$ is transmitted to the device 60 at step 204. At step 206, the device 60 decrypts the encrypted session key $TDES_X(SK)$ using the random number X and stores the session key SK in memory at step 208. The session key SK is thereafter used to encrypt data transferred between the device 60 and the security module 64.

Thus, following validation of the device, key distribution is undertaken by the security module in order to create a secure channel of communication between the device and the security module. Updating of the session key (SK) can also be initiated at any time, for example, upon switching the device on, disc insertion, zapping of the device by the user, establishment of connection with the security module etc.

With reference to FIG. 1, the DVD player 12 typically transmits scrambled data to the display 14 and recorder 18. The steps associated with the descrambling of data received by a device will now be described with reference to FIG. 7, A DVD disk typically stores encrypted Entitlement Control Messages (ECMs) together with the scrambled audio and/or visual data. An ECM is a message related to the scrambled audio and/or visual data The message contains a control word (which allows for the descrambling of the data) and the access criteria of the data. The access criteria and control word are transmitted by the DVD player 12 to, for example, display 14 via the communication link 16.

Figure 7:
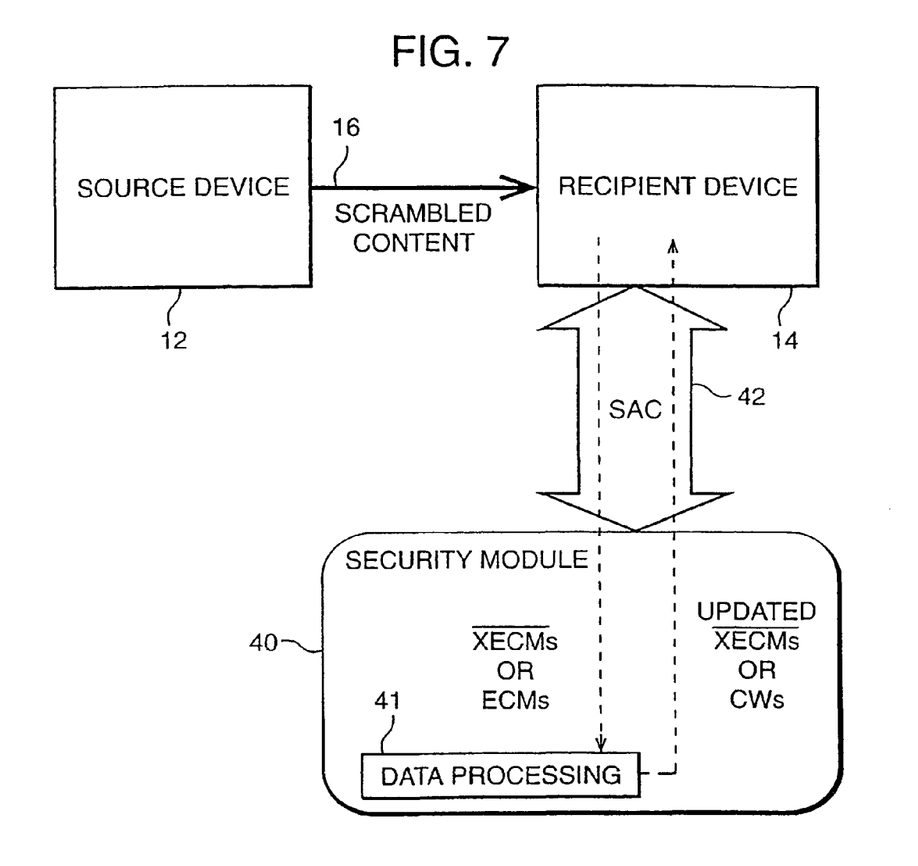
FIG. 7 illustrates the descrambling of data received by a device.

The data stored on the disk typically comprises a number of distinct components; for example a television programme includes a video component, an audio component, a sub-title component and so on. Each of these components is individually scrambled and encrypted. In respect of each scrambled component of the data, a separate ECM is required. Alternatively, a single ECM may be required for all of the scrambled components of a service The control word typically changes every few seconds, and so ECMs are also periodically inserted in the data to enable the changing control word to be descrambled. For redundancy purposes, each ECM typically includes two control words; the present control word and the next control word.

Upon receipt of scrambled data and an encrypted ECM from the DVD player 12, the display 14 extracts the ECM from the scrambled data and passes the extracted ECM to descrambling circuitry for decrypting the ECM and extracting the control word from the decrypted ECM.

The descrambling circuitry may be implemented in a detachable conditional access module 40 or CAM, commonly embodied in the form of a PCMCIA, or PC, card insertable in a socket in the recipient device. Alternatively, the CAM 40 may be physically separate from the recipient device, the CAM 40 and display 14 being communicably linked by any suitable communication link 42, for example via a serial or parallel interface.

The CAM 40 may itself further include a slot to receive a smart card. In such systems, the smartcard controls whether the end user has the right to decrypt the ECM and to access the programme. If the end user does have the rights, the ECM is decrypted by a processor 41 within the smart card and the control word extracted. The processor 41 of the CAM 40 may then descramble the scrambled data to supply the recipient device with a clear data stream for, for example, decompression and subsequent display. Alternatively, the descrambling of the data may be carried out within the display 14 using the control word information communicated to the display 14 from the CAM 40.

In the case where scrambled data is communicated from the DVD player 12 to the digital recorder 18 for subsequent viewing, the manufacturer of the DVD disk may wish to restrict access to the recorded data. For example, the disk manufacturer may wish to prohibit any further copying of the recorded data. In such situations, the access rights, or eXtended Control Management Information (XCMI), are contained is an eXtended Entitlement Control Message (XECM) which includes any access rights as determined by the disk manufacturer. Upon receipt of the XECM, the processor 41 of the CAM 40 decrypts the XECM, modifies the XECM, for example to prohibit any copying of the recorded data, re-encrypts the ECM and passes the modified, re-encrypted ECM back to the recorder device.

In this type of system, sensitive data (control words, modified XECMs or descrambled data) may be passed between the CAM and the display 14 or recorder 18 and problems of security may arise at this interface. To overcome such problems, prior to communication of any data, for example, an ECM from the display 14 to the smartcard, a secure authenticated channel (SAC) 42 is created, as described above with reference to FIGS. 5 and 6, between the display 14 and the CAM 40. In order to create the SAC 42 between the display 14 and the CAM 40, the CAM 40 must store, for example in the smartcard, the list of device public keys in order to validate the display 14.

Figure 8:
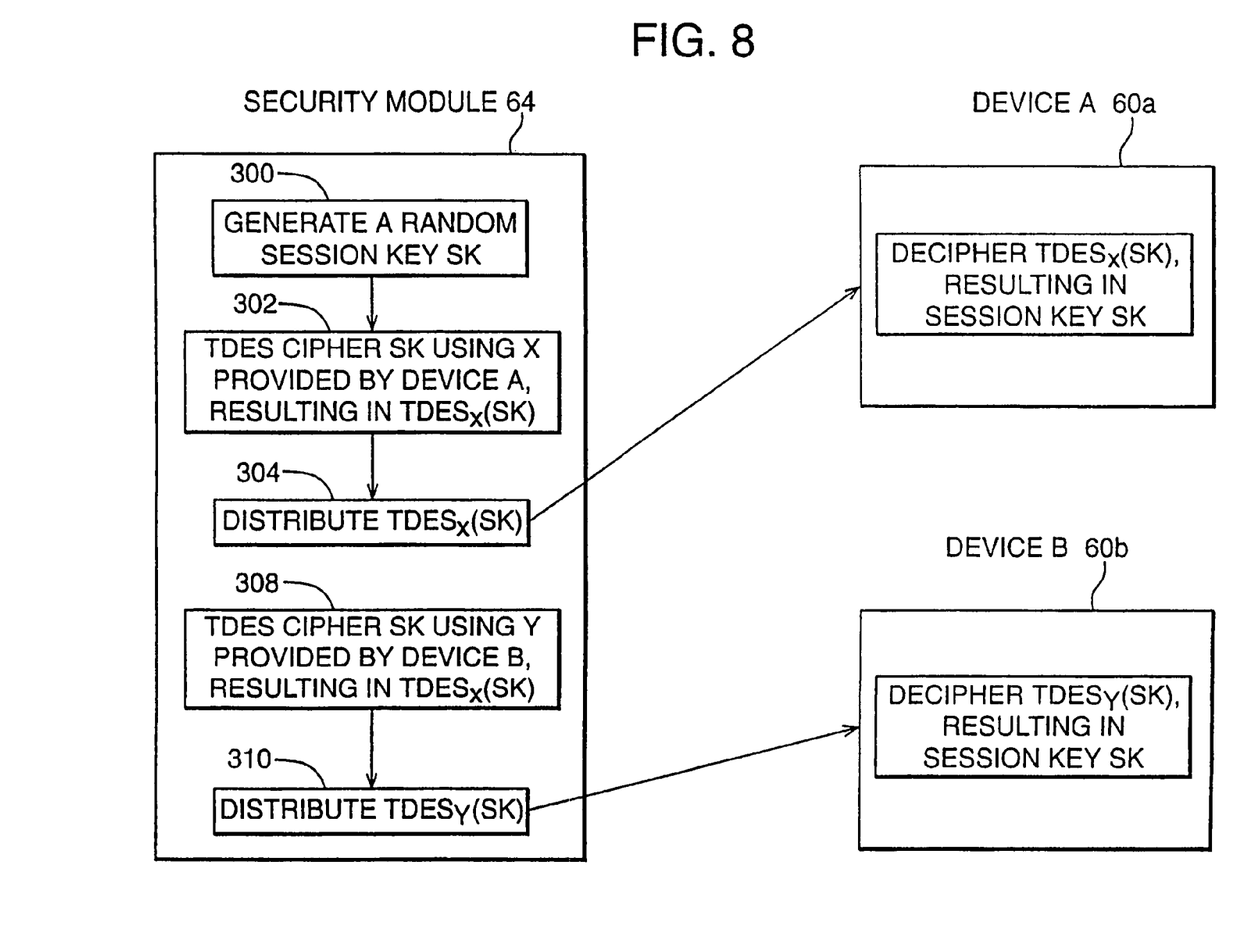
FIG. 8 shows the steps associated with the provision of secure communication between two devices.

As shown in FIG. 4, the security module may be connected to two or more connected devices 60a, 60b via respective communication links 70a, 70b. As well as validating both of these devices, each device being validated as described in FIG. 5, the security module can create a secure communication channel between the devices. FIG. 8 shows the steps associated with the provision of secure communication between two devices.

The provision of secure communication between device A 60a and device B 60b is carried out after both of the devices 60a, 60b have been validated by the security module. With reference to FIG. 8, at step 300 the security module 64 generates a random session key SK. The random session key SK is encrypted at step 302 by the security module 64 using the random number X transmitted to the security module 64 by the device A 60a during validation of the device. The encryption is preferably conducted using a symmetric algorithm, such as Triple DES (TDES).

The encrypted session key $TDES_X(SK)$ is transmitted to the device A 60a at step 304.

At step 306, the device A 60a decrypts the encrypted session key $TDES_X(SK)$ using the random number X and stores the session key SK in memory.

At step 308, the random session key SK is additionally TDES encrypted by the security module 64 using random number Y transmitted to the security module 64 by the device B 60b during validation of the device. The encrypted session key $TDES_Y(SK)$ is transmitted to the device B 60b at step 310. At step 312, the device B 60b decrypts the encrypted session key $TDES_X(SK)$ using the random number Y and stores the session key SK in memory.

Thus, the session key SK is transmitted to each device over a respective SAC. The session key SK can then be used by, for example, device A 60a to encrypt data transmitted to device B 60b via communication link 75.

Figure 9:
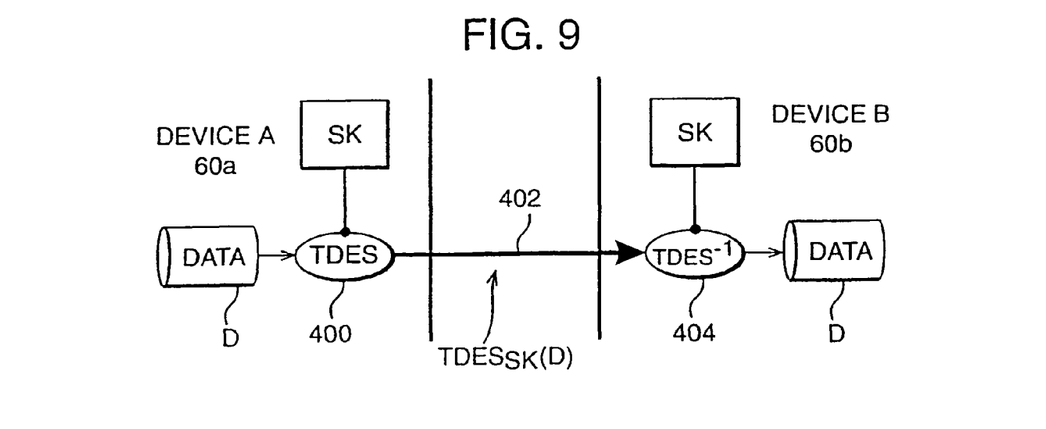
FIG. 9 shows the transfer of data between two devices over a secure communication link.

With reference to FIG. 9, at step 400, device 60a encrypts data D using the session key SK. The encryption algorithm used in a symmetric algorithm, such as Triple DES (TDES) algorithm or such like.

The encrypted data $TDES_{SK}(D)$ is transmitted to device 60b via communication link 75 at step 402. At step 404, device B 60b decrypts the encrypted data $TDES_{SK}(D)$ using the session key SK to obtain the data D.

As discussed above, there is no generation of session keys by any of the devices; session keys are generated only by the security module. Therefore, the above method provides a very simple but yet secure method of providing secure communication between devices, as the data transmitted by one device can only be decrypted by a device which has established a secure authenticated channel with the same security module as that one device.

Figure 10:
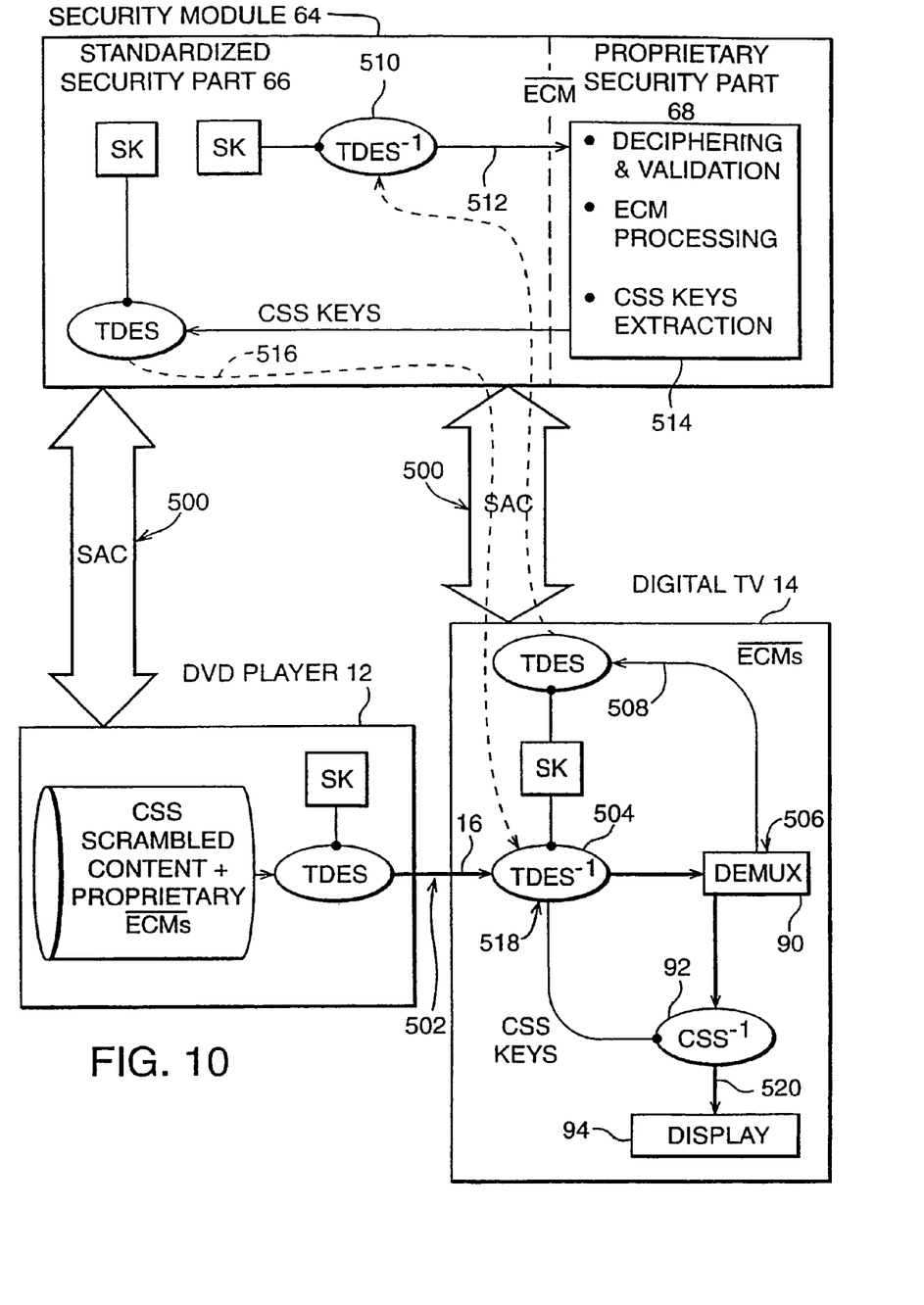
FIG. 10 shows the steps associated with the setting up of a secure communication link between a DVD player and a digital television and the subsequent operations carried out to descramble data received from the DVD player by the digital television.
Figure 11:
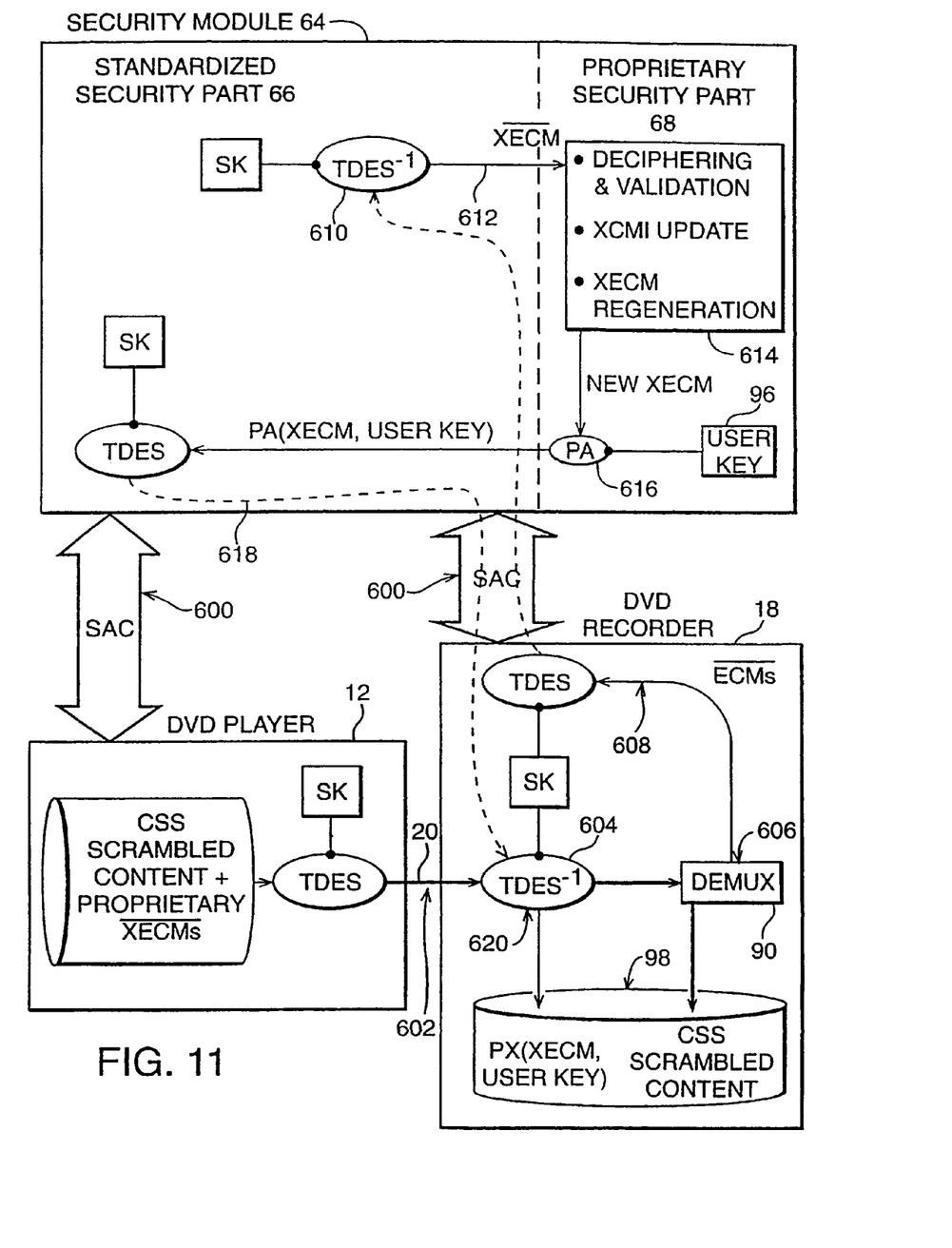
FIG. 11 shows the steps associated with the setting up of a secure communication link between a DVD player and a digital recorder and the subsequent operations carried out to descramble data received from the DVD player by the digital recorder.

As discussed with reference to FIG. 7, in addition to carrying out validation of devices and the creation of SACs, the security module may transmit control words, access rights and/or scrambled data to a device. FIGS. 10 and 11 illustrate examples in which a security module sets up a secure communication link between two devices and subsequently transmits data associated with scrambled data to a device.

FIG. 10 shows, in a first example, the steps associated with the setting up of a secure communication link between a DVD player and a digital television and the subsequent operations carried out to descramble data received from the DVD player by the digital television.

In step 500, the security module 64 determines the validity of each of the DVD player 12 and the digital TV 14, using steps as described above with reference to FIG. 5. If the two devices are determined to be valid, the security module 64 establishes secure authenticated channels (SACs) with the DVD player 12 and the digital TV, using the steps as described above with reference to FIG. 6. As a result of establishing the SACs, a session key SK is stored in each of the devices and in the security module.

In step 502, data comprising Control System Scrambled (CSS) data and proprietary encrypted ECMs containing control words for descrambling the data are encrypted by the DVD player 12 using the session key SK and transmitted to the digital TV via the communication link 16.

The encrypted data is received by the digital TV 14 in step 504 and decrypted using the session key SK. The scrambled data is passed to a demultiplexer 90 which, in step 506, separates the CSS data from the encrypted ECMs. The encrypted ECMs are passed over the SAC by the digital TV 14 to the security module 64 in step 508. For transfer to the security module 64 over the SAC, the encrypted ECMs are further encrypted by the digital TV 14 using the session key SK generated by the security module 64.

As shown in FIG. 10, the security module is notionally divided into a standardized security part 66 and a proprietary security part 68. The twice-encrypted ECMs are received at the standardized security part 66 in step 510 and decrypted once using the session key SK. In step 512, the proprietary encrypted ECMs are passed to the proprietary security part 68 which, in step 514, decrypts and validates the encrypted ECMs using an equivalent key to the proprietor's key used to encrypt the ECMs, and processes the ECM, if authorised, to extract the control words, or CSS keys, from the ECM.

In step 516, the CSS keys are passed to the standardized security part 66 which encrypts the CSS keys using the session key SK and passes the encrypted CSS keys to the digital TV 14 over the SAC. The received encrypted CSS keys are decrypted by the digital TV 14 using the session key at step 518 and subsequently passed to a descrambler 92 for use in descrambling the CSS data. At 520, the descrambled data is transmitted to display 94 for display.

As will be readily understood from the above, control words are always encrypted using the session key SK before being transmitted between any of the devices and the security module.

In the above example, the control words are contained in ECMs. However, the ECMs may be contained in XECMs together with XCMI, or access rights, which are processed by the proprietary security part 68, for example, to determine whether the user's rights to view the data have expired.

FIG. 11 shows, in the second example, the steps associated with the setting up of a secure communication link between a DVD player and a digital recorder and the subsequent operations carried out to descramble data received from the DVD player by the digital recorder.

In step 600, the security module 64 determines the validity of each of the DVD player 12 and the digital recorder 18, using steps as described above with reference to FIG. 5. If the two devices are determined to be valid, the security module 64 establishes secure authenticated channels (SACs) with the DVD player 12 and the digital recorder 18, using the steps as described above with reference to FIG. 6. As a result of establishing the SACs, a session key SK is stored in each of the devices and in the security module.

In step 602, data comprising Control System Scrambled (CSS) data and proprietary encrypted XECMs containing control words for descrambling the data and XCMI are encrypted by the DVD player 12 using the session key SK and transmitted to the recorder via the communication link 20.

The encrypted data is received by the recorder 18 in step 604 and decrypted using the session key SK. The scrambled data is passed to a demultiplexer 90 which, in step 606, separates the CSS data from the encrypted XECMs. The encrypted XECMs are passed over the SAC by the recorder 18 to the security module 64 in step 608. For transfer to the security module 64 over the SAC, the encrypted XECMs are further encrypted by the recorder 18 using the session key SK generated by the security module 64.

As shown in FIG. 11, the security module is notionally divided into a standardized security part 66 and a proprietary security part 68. The twice-encrypted XECMs are received at the standardized security part 66 in step 610 and decrypted once using the session key SK. In step 512, the proprietary encrypted XECMs are passed to the proprietary security part 68 which, in step 614, decrypts and validates the encrypted XECMs using an equivalent key to the proprietor's key used to encrypt the XECMs, and processes the XECMs, if authorised, to update the XCMI, for example, to limit the number of times which the user may replay the data, to prohibit any further re-recording of the data etc.

In step 616, the modified XECMs are encrypted using a proprietary algorithm PA and a user key 96 stored in the security module 68. This adds security to the data recorded by the recorder 18; the control words for descrambling the CSS data can only be extracted from the modified XECM if the user has access to the user key. Thus, playback and viewing of the recorded data is restricted to the holder of the security module.

In step 618, the encrypted XECMs are passed to the standardized security part 66 which further encrypts the encrypted XECMs using the session key SK and passes the encrypted XECMs to the recorder over the SAC. The received encrypted XECMs are decrypted once by the recorder using the session key at step 620 and subsequently passed to a recording medium 98, such as DAT tape, for storing the CSS data and the encrypted XECMs.

It will be understood that the present invention has been described above purely by way of example, and modifications of detail can be made within the scope of the invention.

For example, whilst the above examples have described the provision of a communication link between devices using an IEEE 1394 digital interface, unidirectional links such as 8-VSB and 16-VSB may also be used.

It is not essential for a device to pass certificates directly to a security module. For example, where a first device is unable to receive data from a security module, the first device may pass its certificates to a second device in two-way communication with the security module for validation of the first device.

In the described examples, only one security module is provided. However, different security modules may coexist within a network comprised of a number of devices connected via various interfaces.

Each feature disclosed in the description, and (where appropriate) the claims and drawings may be provided independently or in any appropriate combination.

The invention claimed is:

1. A computer-implemented method of secure communication of digital data between a first device and a second device, said method comprising:

receiving a first device identifier and a first random number from the first device and a second device identifier and a second random number from the second device by a security module comprising a processor;

making a first determination, by the processor, that the first device identifier matches at least a first stored identifier in the security module;

making a second determination, by the processor, that the second device identifier matches at least a second stored identifier in the security module;

in response to the first determination and the second determination, validating, by the processor in the security module, the first and second device;

generating, by the processor, a random key in the security module in response to successful validation of the first and second device;

transmitting the random key encrypted by the first random number to the first device; and transmitting the random key encrypted by the second random number to the second device, wherein after the random key encrypted by the first random number is decrypted by the first device and after the random key encrypted by the second random number is decrypted by the second device, the random key enables the secure communication of the digital data between the first and second device.

2. The method according to claim 1, wherein the first random number and the second random number are each encrypted using a public key of the security module.

3. The method according to claim 2, wherein the first random number is sent in encrypted form to the security module and is decrypted by the security module using a private key of the security module to obtain the first random number.

4. The method according to claim 3, wherein the first random number is randomized by the first device prior to encryption, and wherein the first random number is de-randomized by the security module following decryption of the first random number.

5. The method according to claim 1, wherein said random key is periodically changed by the security module.

6. The method according to claim 1 as applied to a home network system, the first and second device corresponding to a first and second consumer electronic device, respectively, adapted to transfer the digital data there between via a communication link.

7. A system comprising:
   a first device comprising a first device identifier and adapted to generate a first random number;
   a second device comprising a second device identifier and adapted to generate a second random number;
   a security module comprising:
      a processor for:
         receiving the first device identifier and the first random number from the first device; and
         receiving the second device identifier and the second random number from the second device;
      a memory for storing a plurality of stored identifiers comprising a first stored identifier and a second stored identifier;
   wherein the processor is further configured to:
   make a first determination that the first device identifier matches at least the first stored identifier of the plurality of stored identifiers;
   make a second determination that the second device identifier matches at least the second stored identifier of the plurality of stored identifiers;
   validate the first and second device using the first determination and the second determination;
   generate a random key in response to successful validation of the first and second device, and;
   communicate the random key encrypted by the first random number to the first device and communicate the random key encrypted by the second random number to the second device,
   wherein after the random key encrypted by the first random number is decrypted by the first device and after the random key encrypted by the second random number is decrypted by the second device, the random key enables secure communication of digital data between the first and second device.

8. The method according to claim 1, wherein the digital data communicated between the devices is encrypted using the random key.

9. The method according to claim 1, wherein the security module is attached to the first device.

* * * * *